No. 790,570. PATENTED MAY 23, 1905.
A. B. HENDRYX.
BIRD CAGE.
APPLICATION FILED JAN. 30, 1905.
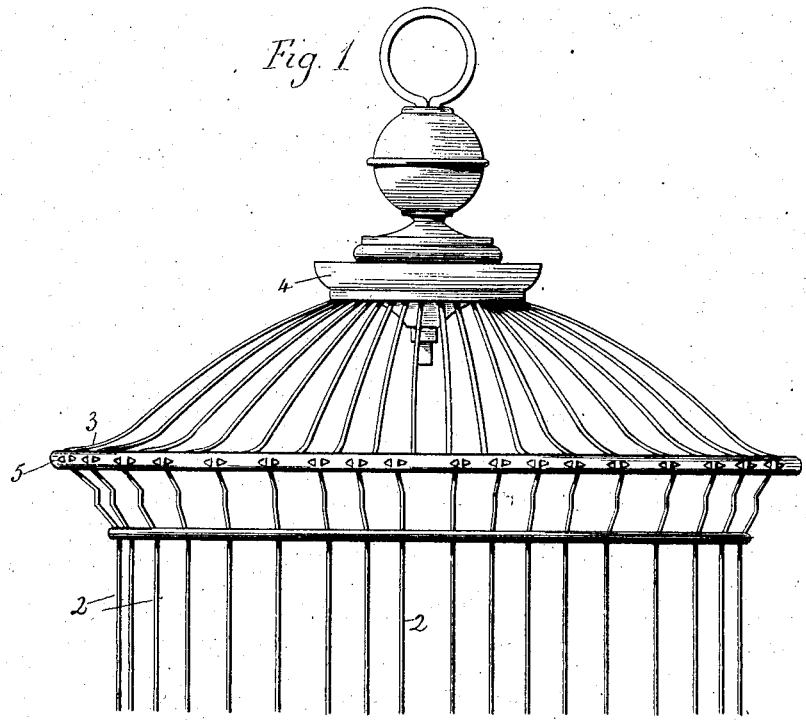
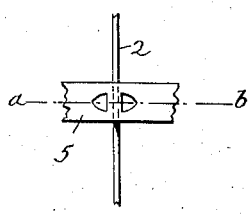
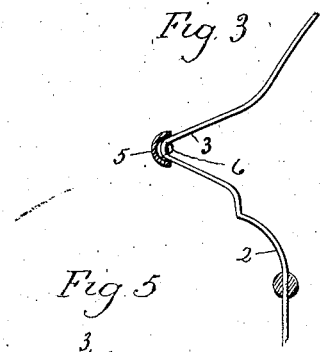
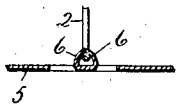
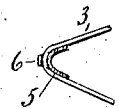

No. 790,570.

Patented May 23, 1905.

UNITED STATES PATENT OFFICE.

ANDREW B. HENDRYX, OF NEW HAVEN, CONNECTICUT.

BIRD-CAGE.

SPECIFICATION forming part of Letters Patent No. 790,570, dated May 23, 1905.

Application filed January 30, 1905. Serial No. 243,193.

*To all whom it may concern:*

Be it known that I, ANDREW B. HENDRYX, a citizen of the United States, residing at New Haven, in the county of New Haven and State of Connecticut, have invented a new and useful Improvement in Bird-Cages; and I do hereby declare the following, when taken in connection with the accompanying drawings and the numerals of reference marked thereon, to be a full, clear, and exact description of the same, and which said drawings constitute part of this specification, and represent, in—

Figure 1, a broken side view of the upper portion of a cage constructed in accordance with my invention; Fig. 2, a side view of a portion of the reinforcing-band and one of the wires connected therewith; Fig. 3, a vertical sectional view showing one of the wires engaged with the reinforcing-band; Fig. 4, a transverse sectional view showing a portion of the band and one of the wires connected therewith; Fig. 5, a vertical sectional view showing one of the wires with the reinforcing-band arranged inside the crown.

This invention relates to an improvement in bird-cages, and particularly to such as are formed with a crown or projection near the top formed by bending the wires outward and then abruptly inward. In the majority of cages comparatively small wires are employed and have more or less spring, and in packing and in use these wires are liable to become displaced, so as to separate sufficiently to allow a bird to escape.

The object of this invention is to place a binder or stiffening-band around the cage at the edge of the crown and connect each wire therewith; and the invention consists in the construction as hereinafter described, and particularly recited in the claims.

The cage may be of any approved design having vertical wires forming the sides of the cage, these wires near the upper end being bent outward beyond the plane of the side wires 2 and thence inward, forming a sharp bend 3, from whence they extend inwardly and upwardly to the head 4. Around the edge of the crown at the bend 3 is placed a binding strip or band 5, this band being transversely bowed, so as to rest upon the wires above and below the bend. To secure the band in place and to hold the wires, the band is formed with a series of double fingers 6, cut from the central portion of the band and turned inward and around the several wires, as clearly shown in Figs. 3 and 4, the ends of the band being united in any desired manner, so as to form a continuous band. By bowing this band it is made rigid and not only holds the wires in position, but greatly strengthens or reinforces the cage and avoids the possibility of the cage becoming deformed in packing for shipment.

Instead of placing the reinforcing-band around the outside of the crown and having the fingers extending inward therefrom around the wires the band might be placed inside the crown, as shown in Fig. 5, in which case the fingers would project outward and be turned over the outside of the wires; but I prefer to arrange the band outside, as first described.

I am aware that reinforcing-bands have been applied to cages, the wires of the cage extending through the band or being otherwise connected thereto. I therefore do not wish to be understood as claiming, broadly, such as my invention.

Having fully described my invention, what I claim as new, and desire to secure by Letters Patent, is—

1. A bird-cage having vertical side wires said wires bent out of a vertical plane, a reinforcing-band at said bend, said band transversely bowed and formed with a series of integral projecting fingers, said fingers bent around the wires of the cage, substantially as described.

2. A wire bird-cage having an outwardly-projecting crown and a reinforcing-band transversely bowed and arranged outside the edge of said crown, said band provided with inwardly-projecting fingers formed integral therewith and bent around the wires of the cage, substantially as described.

3. A wire bird-cage having an outwardly-projecting crown and a reinforcing-band transversely bowed and arranged outside the edge of said crown, said band provided with a series of pairs of inwardly-projecting fingers, the number in the series corresponding to the number of the wires in the cage, and the fingers of each pair bent around a corresponding wire, substantially as described.

In testimony whereof I have signed this specification in the presence of two subscribing witnesses.

ANDREW B. HENDRYX.

Witnesses:
EDWARD N. PECK,
ARTHUR B. ALLING.